US011668264B2

(12) United States Patent
Calme et al.

(10) Patent No.: US 11,668,264 B2
(45) Date of Patent: Jun. 6, 2023

(54) LONG-FIBRE-REINFORCED-JOINTS-COMPOSITE THRUST REVERSER CASCADE

(71) Applicants: DEDIENNE MULTIPLASTURGY GROUP, Aubain sur Gaillon (FR); INGELIANCE TECHNOLOGIES, Merignac (FR)

(72) Inventors: Odnel Calme, Merignac (FR); Nicolas Jacquemin, Saint Aubin sur Gaillon (FR); Frédéric Larrouy, Saint Aubin sur Gaillon (FR); François Ribour, Merignac (FR)

(73) Assignees: DEDIENNE MULTIPLASTURGY GROUP, Aubain Sur Gaillon (FR); INGELIANCE TECHNOLOGIES, Merignac (FR)

( * ) Notice: Subject to any disclaimer, the term of this patent is extended or adjusted under 35 U.S.C. 154(b) by 54 days.

(21) Appl. No.: 16/920,185

(22) Filed: Jul. 2, 2020

(65) Prior Publication Data
US 2021/0285398 A1 Sep. 16, 2021

(30) Foreign Application Priority Data
Jul. 4, 2019 (FR) ..................... 1907475

(51) Int. Cl.
| F02K 1/56 | (2006.01) |
| F02K 1/72 | (2006.01) |
| B29C 70/06 | (2006.01) |
| B64D 33/04 | (2006.01) |
| B29L 31/08 | (2006.01) |

(52) U.S. Cl.
CPC ............... *F02K 1/56* (2013.01); *B29C 70/06* (2013.01); *B64D 33/04* (2013.01); *F02K 1/72* (2013.01); *B29L 2031/08* (2013.01); *F05D 2220/323* (2013.01); *F05D 2230/20* (2013.01); *F05D 2230/31* (2013.01); *F05D 2240/129* (2013.01);
(Continued)

(58) Field of Classification Search
CPC ........ F02K 1/56; F02K 1/72; F05D 2240/129; F05D 2300/603; F05D 2300/6034
See application file for complete search history.

(56) References Cited

U.S. PATENT DOCUMENTS

| 4,596,621 A | 6/1986 | Nawaz |
| 2009/0317246 A1* | 12/2009 | Lutz ..................... F01D 25/246 415/200 |

(Continued)

OTHER PUBLICATIONS

International Search Report received from the French Patent Office in related Application No. 1907475 dated Mar. 20, 2020.

*Primary Examiner* — Andrew H Nguyen
(74) *Attorney, Agent, or Firm* — The Marbury Law Group, PLLC

(57) ABSTRACT

Thrust reverser composite cascade (1), comprising at least one longitudinal wall (15) and transverse walls (14) connecting to this longitudinal wall, characterized in that the longitudinal wall comprises at least one continuous longitudinal fibre bundle (19) and the transverse walls each comprise at least one continuous transverse fibre bundle (23) crossing the longitudinal bundle, so that the intersections (16) of the transverse and longitudinal walls are structurally bridged in both directions by the reinforcing continuous longitudinal and transverse fibre bundles.

18 Claims, 15 Drawing Sheets

(52) U.S. Cl.
CPC .................. *F05D 2300/603* (2013.01); *F05D 2300/6034* (2013.01)

(56) References Cited

U.S. PATENT DOCUMENTS

| | | |
|---|---|---|
| 2015/0226157 A1 | 8/2015 | Calder et al. |
| 2016/0186689 A1 | 6/2016 | Bartel et al. |
| 2016/0263820 A1 | 9/2016 | Kruckenberg |
| 2017/0057166 A1* | 3/2017 | Soria .................... B29C 64/118 |
| 2018/0029273 A1* | 2/2018 | Okabe .................... F04D 29/02 |
| 2018/0340492 A1 | 11/2018 | Harpal et al. |
| 2019/0285028 A1* | 9/2019 | Shetty ....................... F02K 1/72 |
| 2020/0094444 A1* | 3/2020 | Chuck ..................... B29C 43/36 |

\* cited by examiner

[Fig. 1]
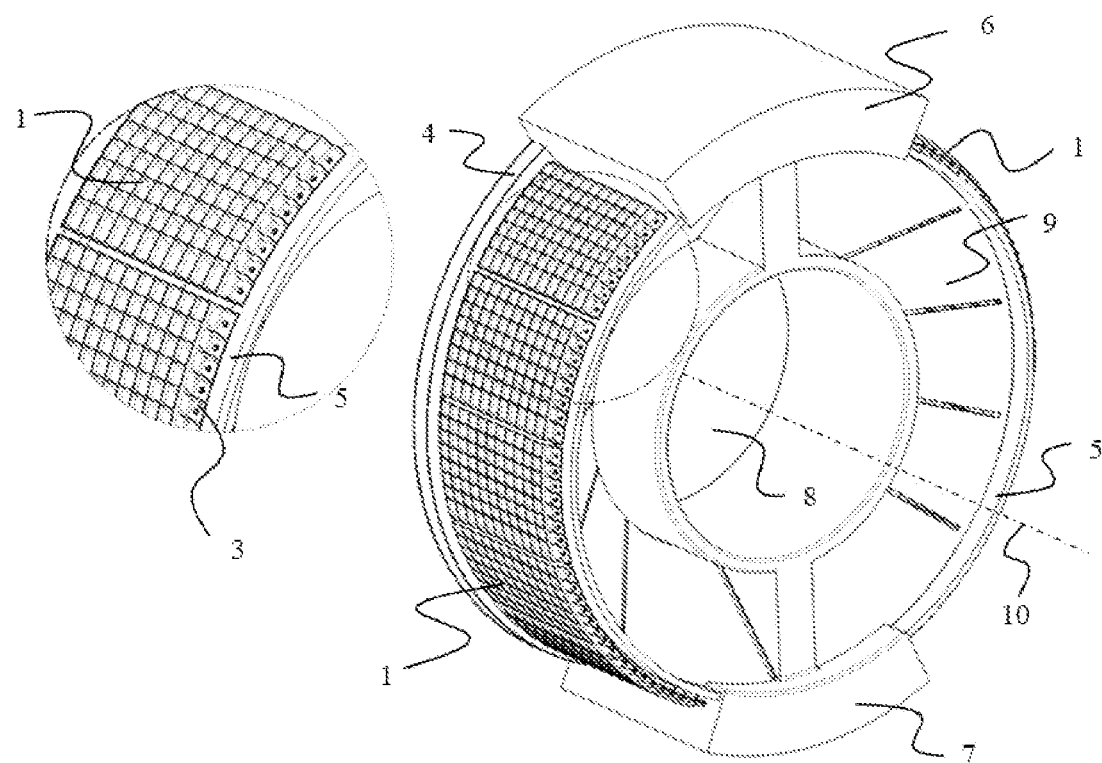

[Fig. 2]
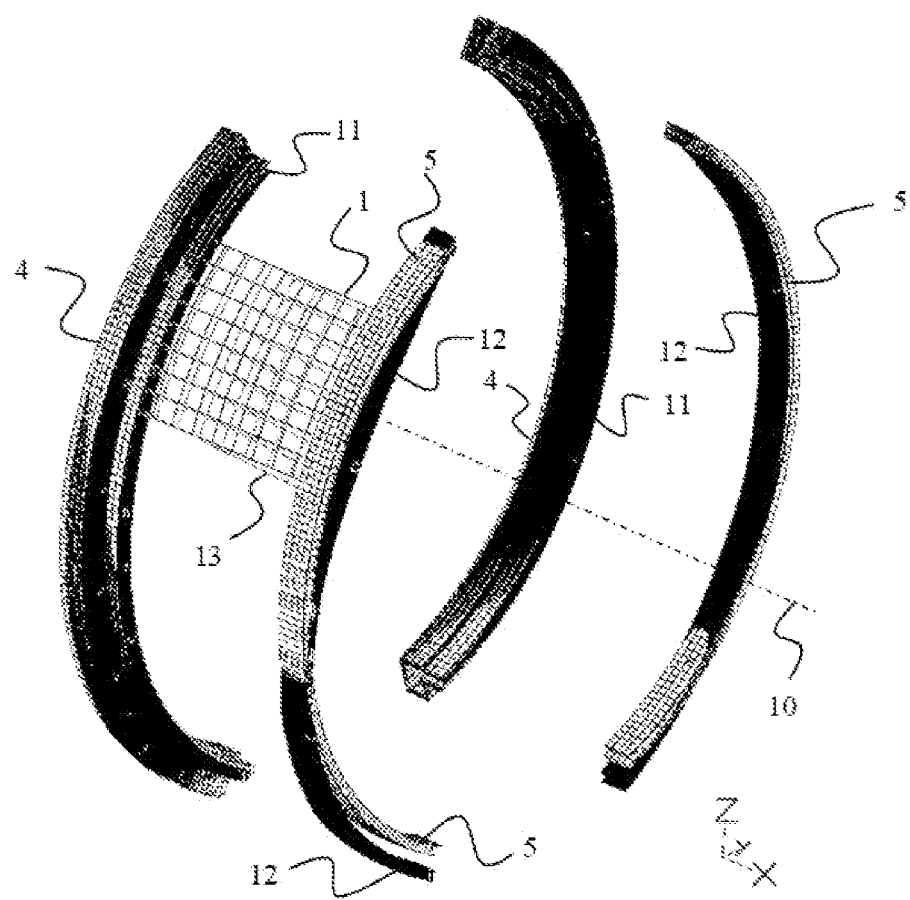

[Fig. 3]
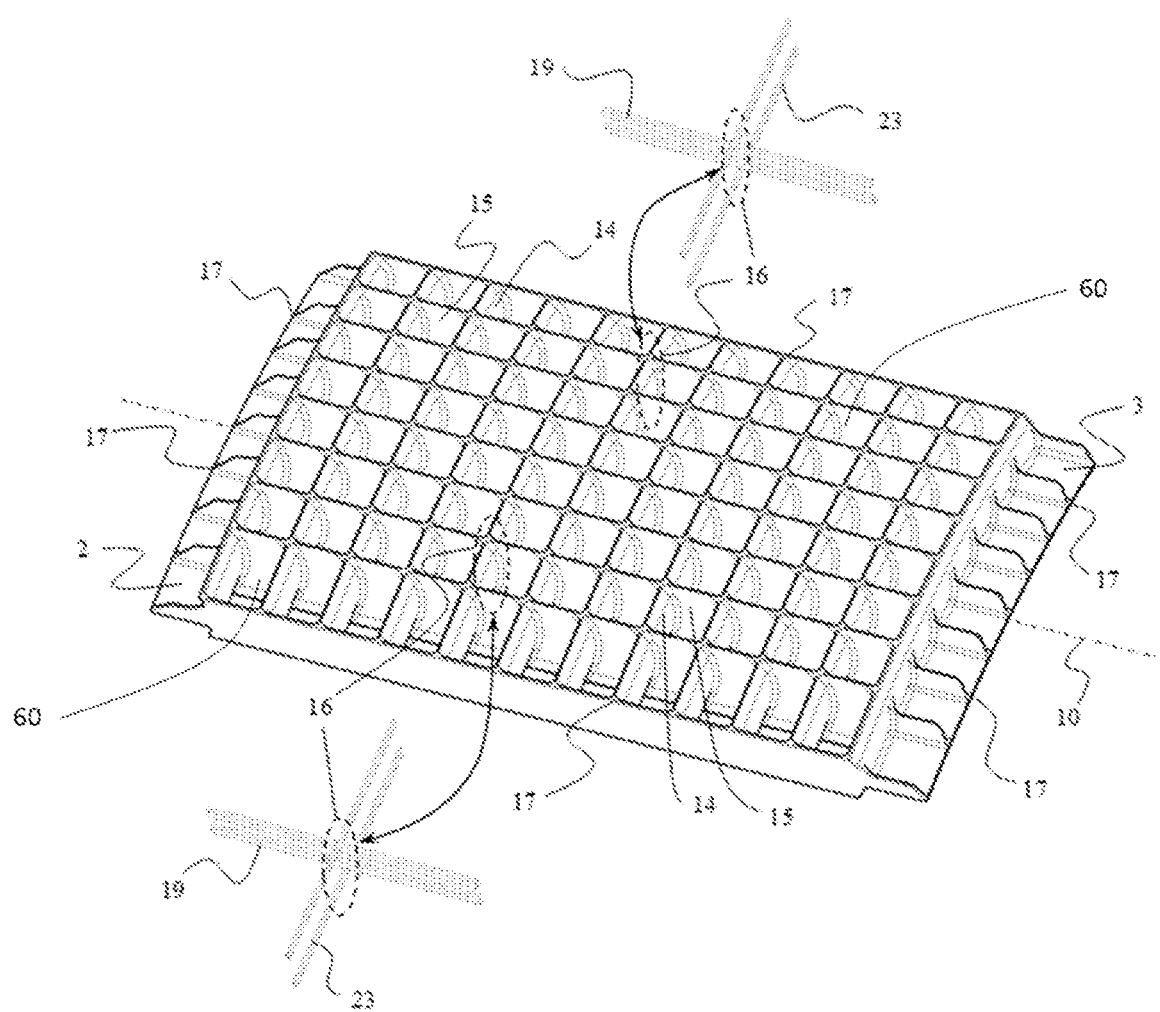

[Fig. 4]
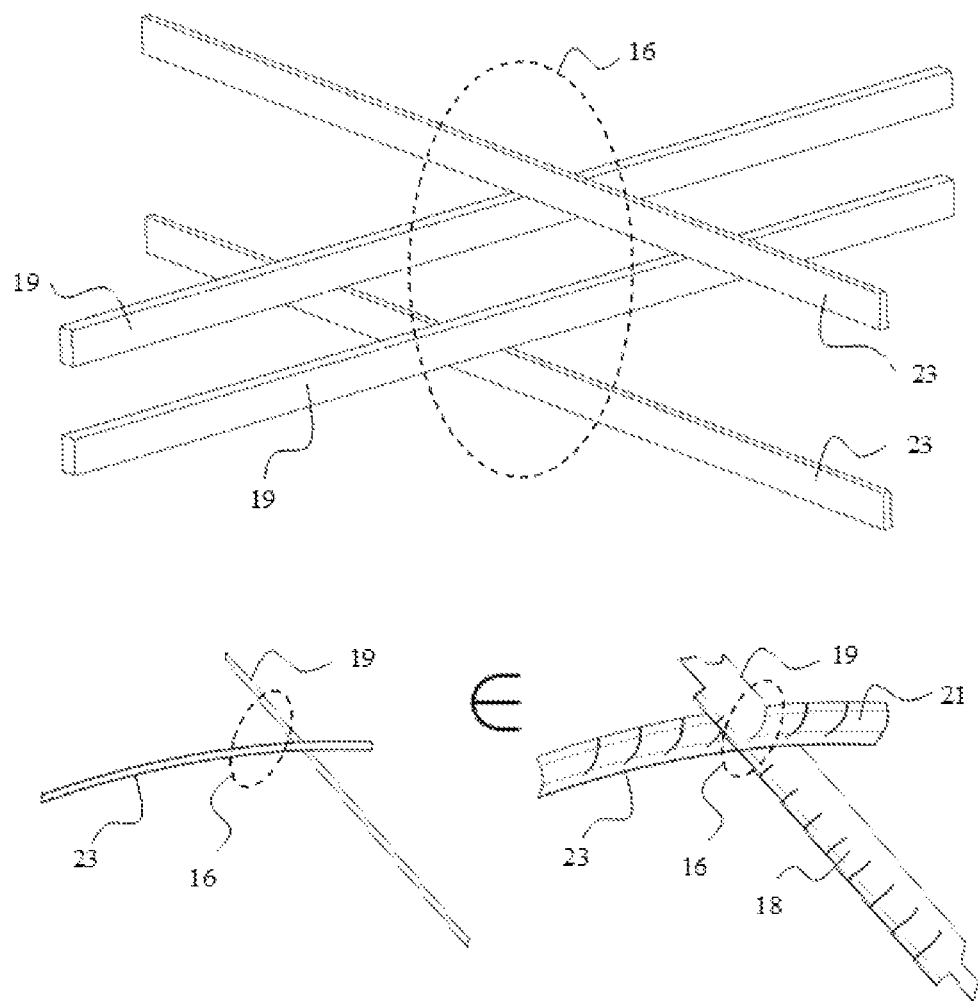

[Fig. 5]
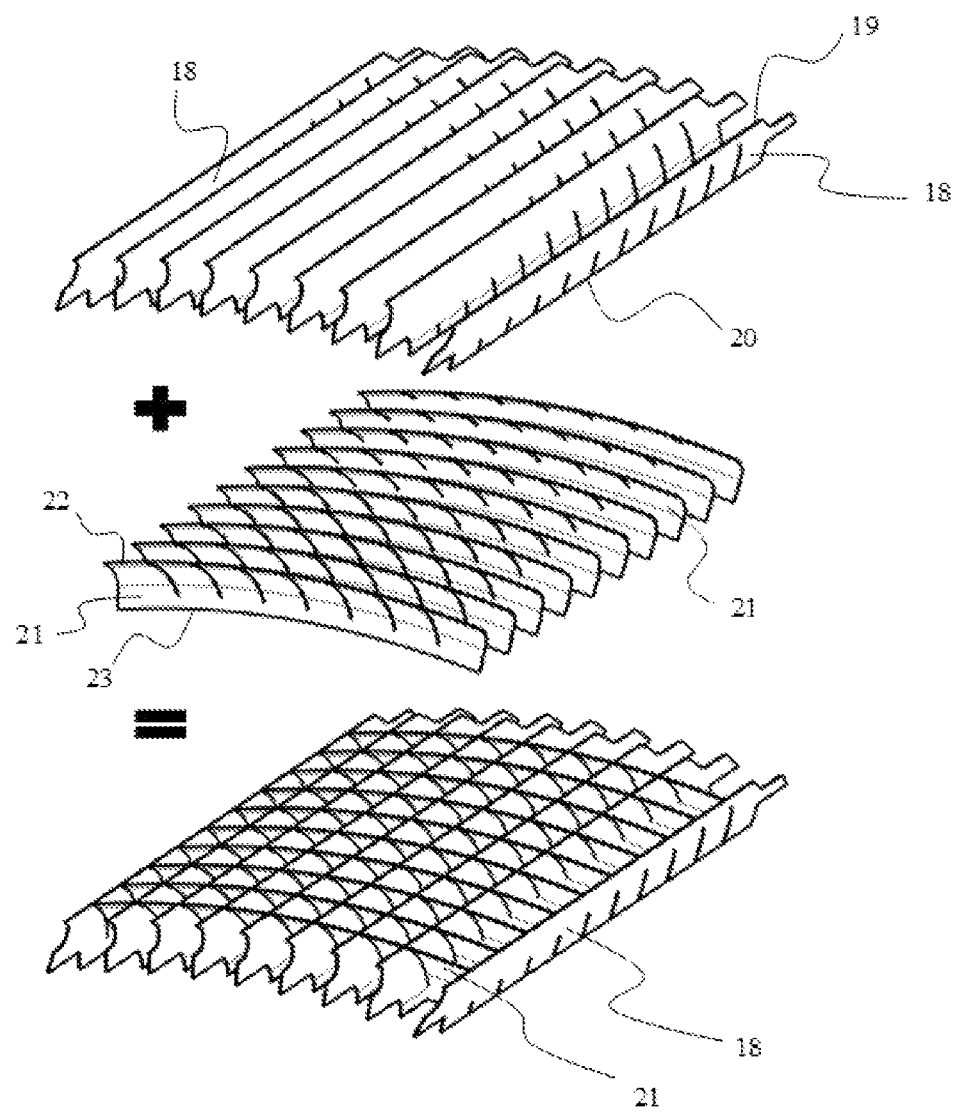

[Fig. 6]
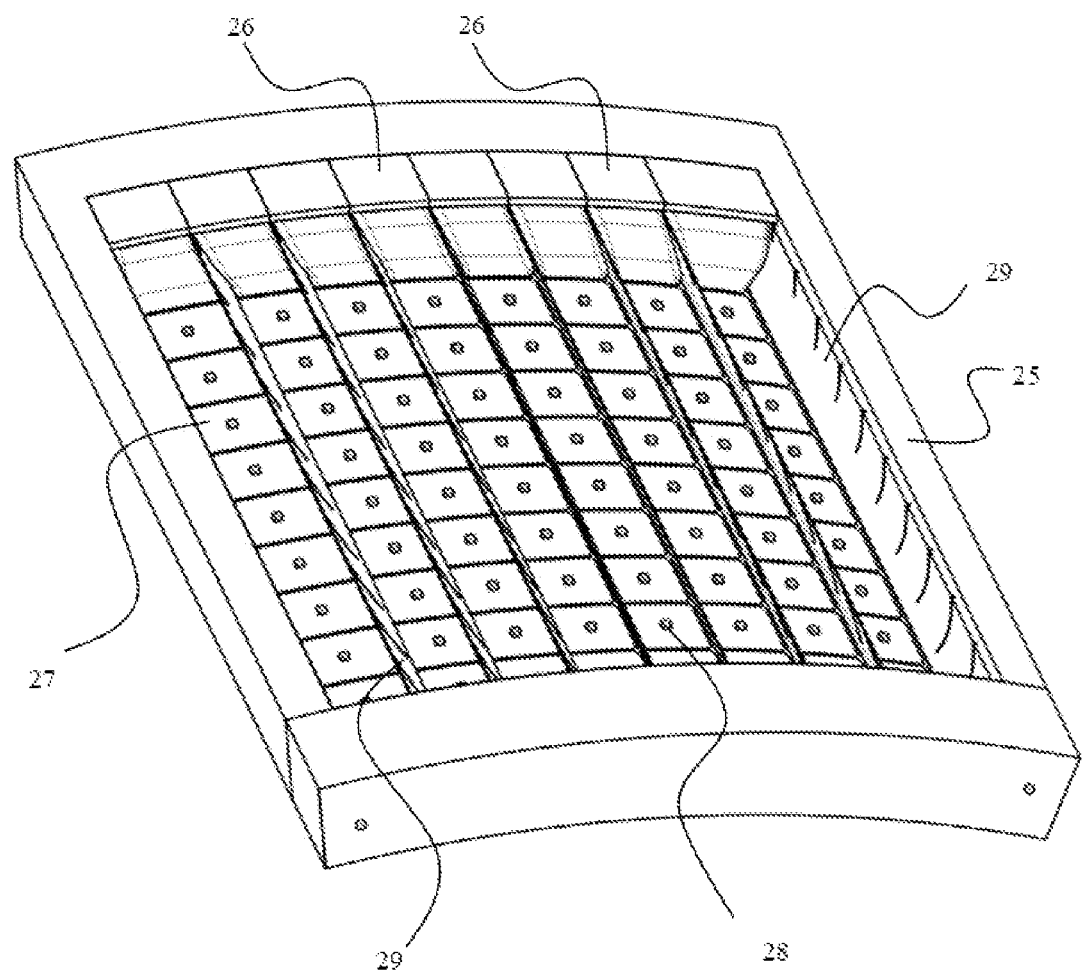

[Fig. 7]
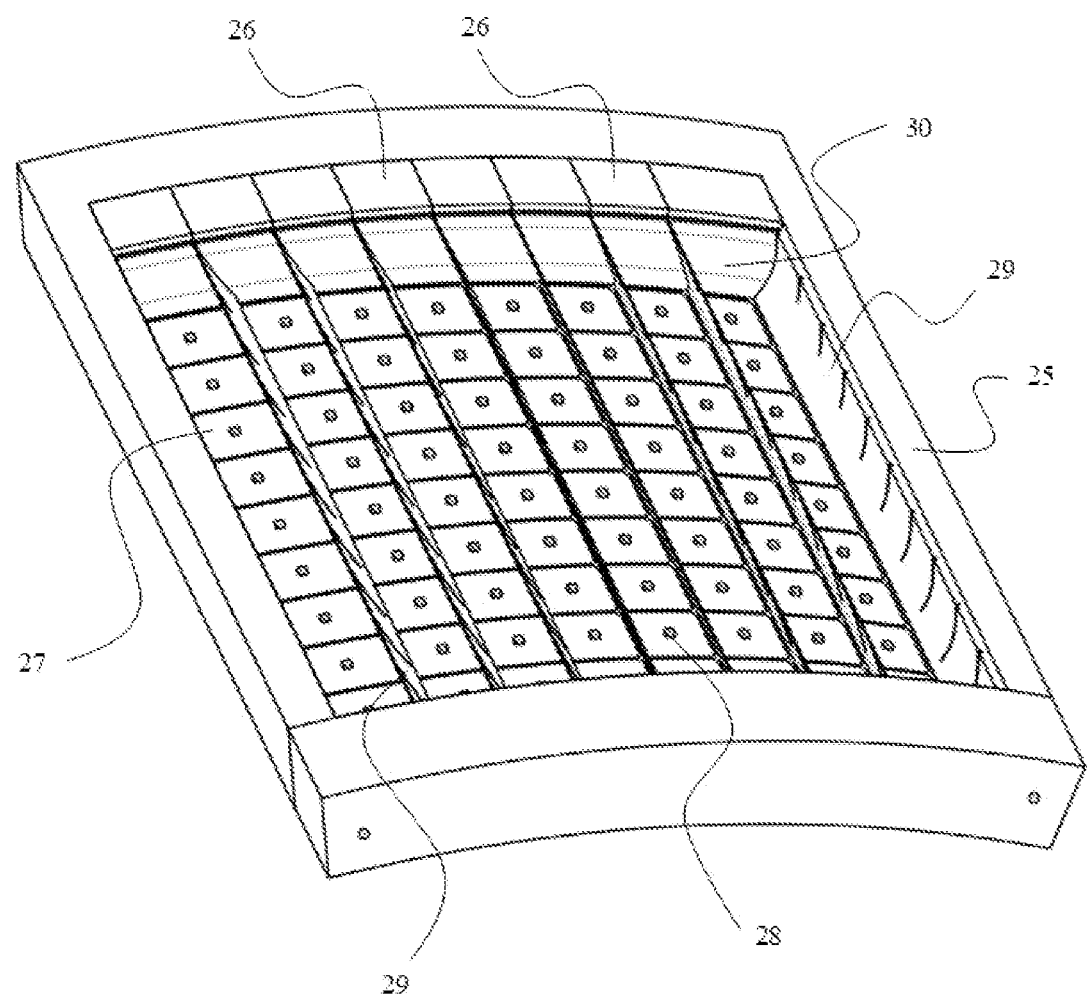

[Fig. 8]
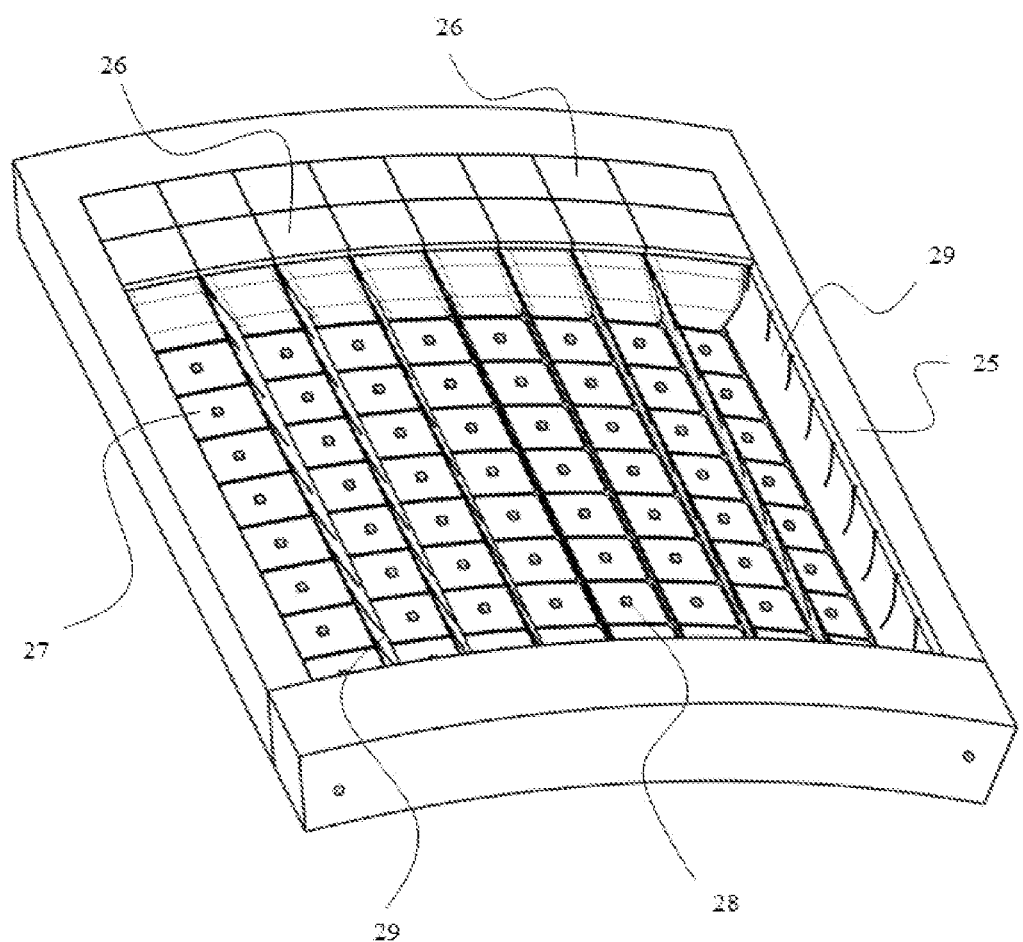

[Fig. 9]
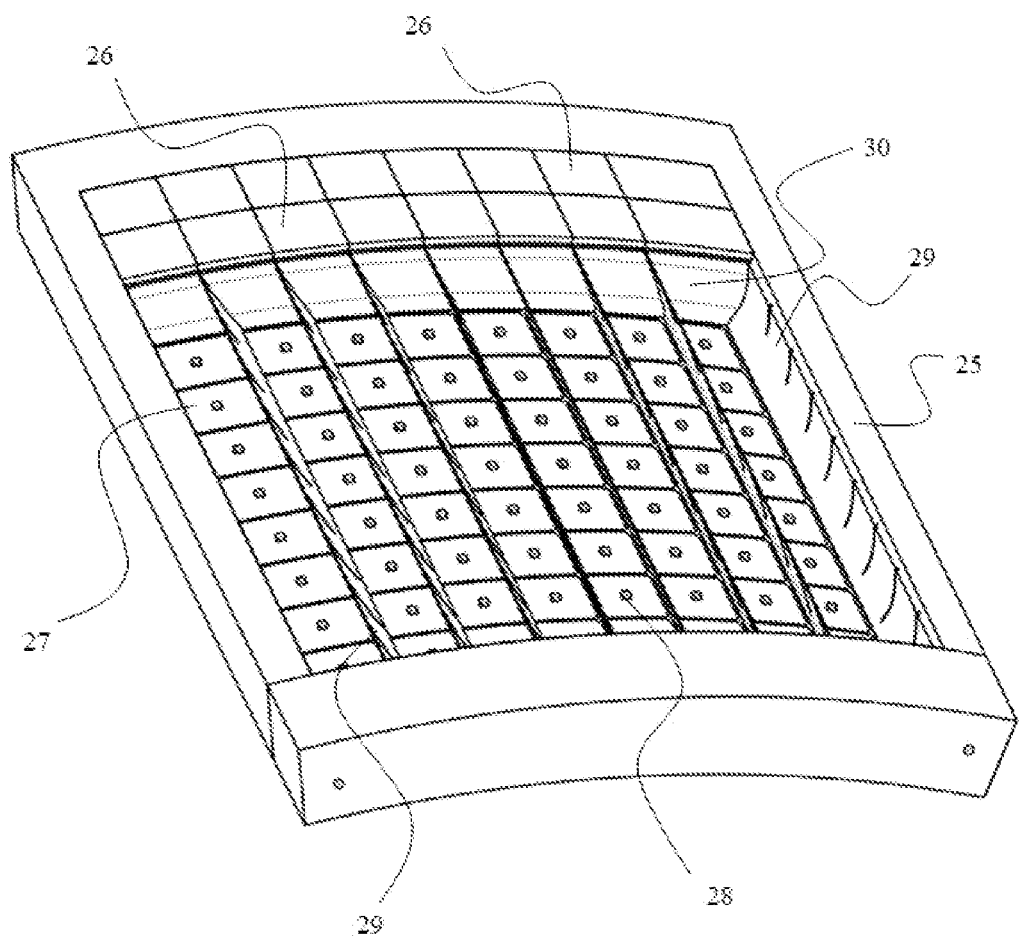

[Fig. 10]
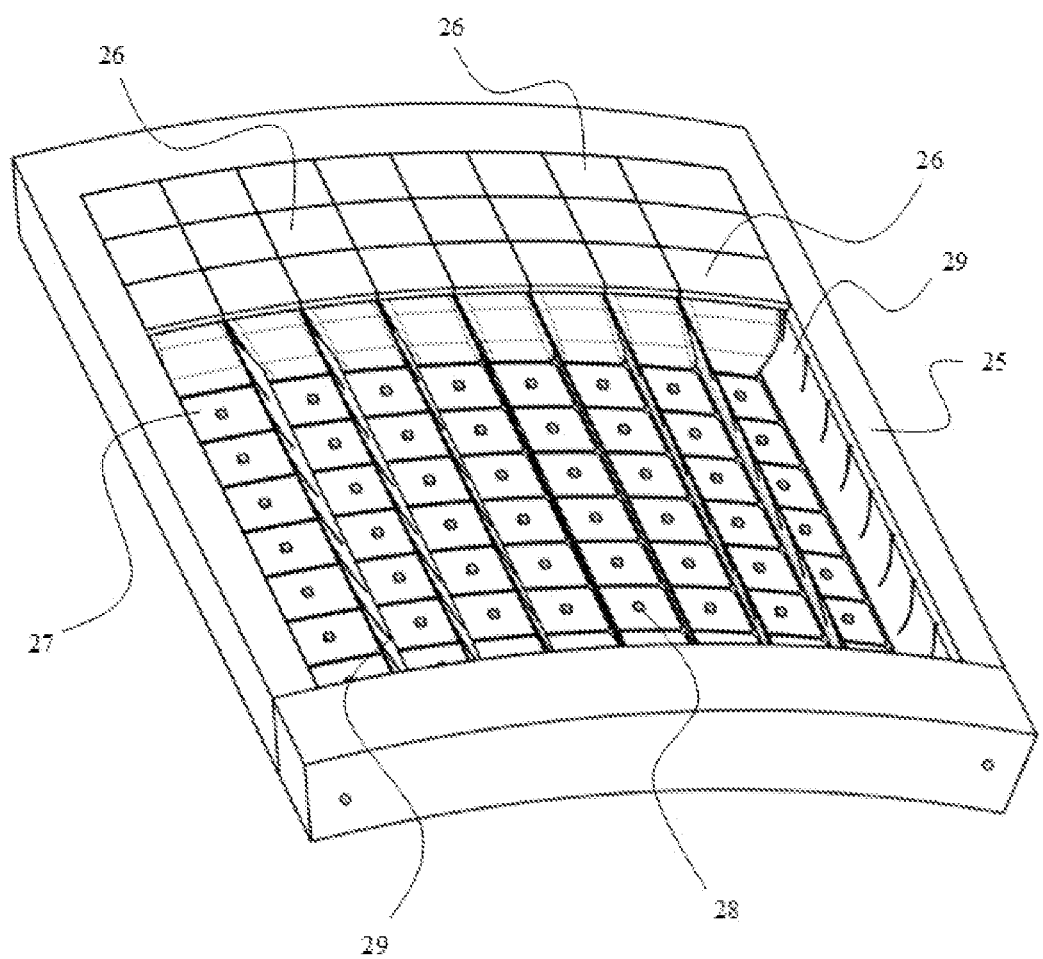

[Fig. 11]
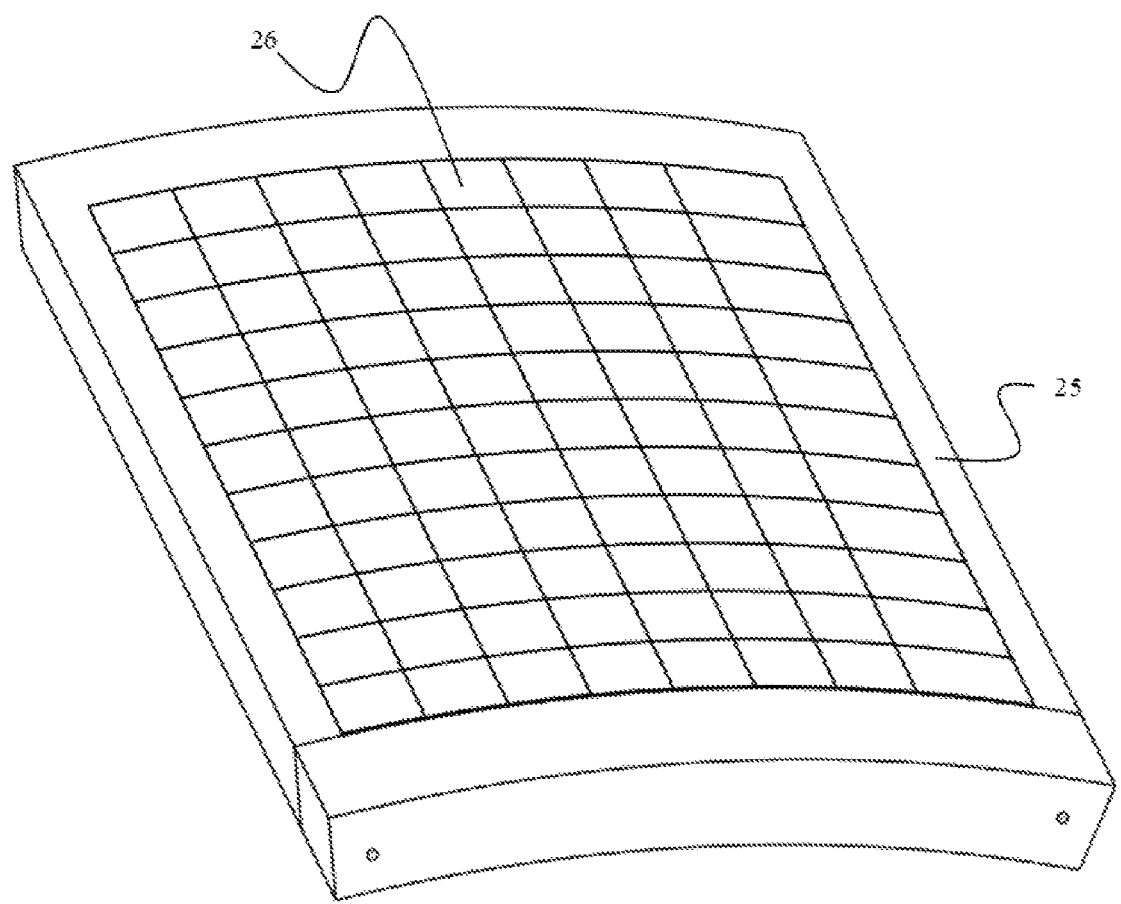

[Fig. 12]
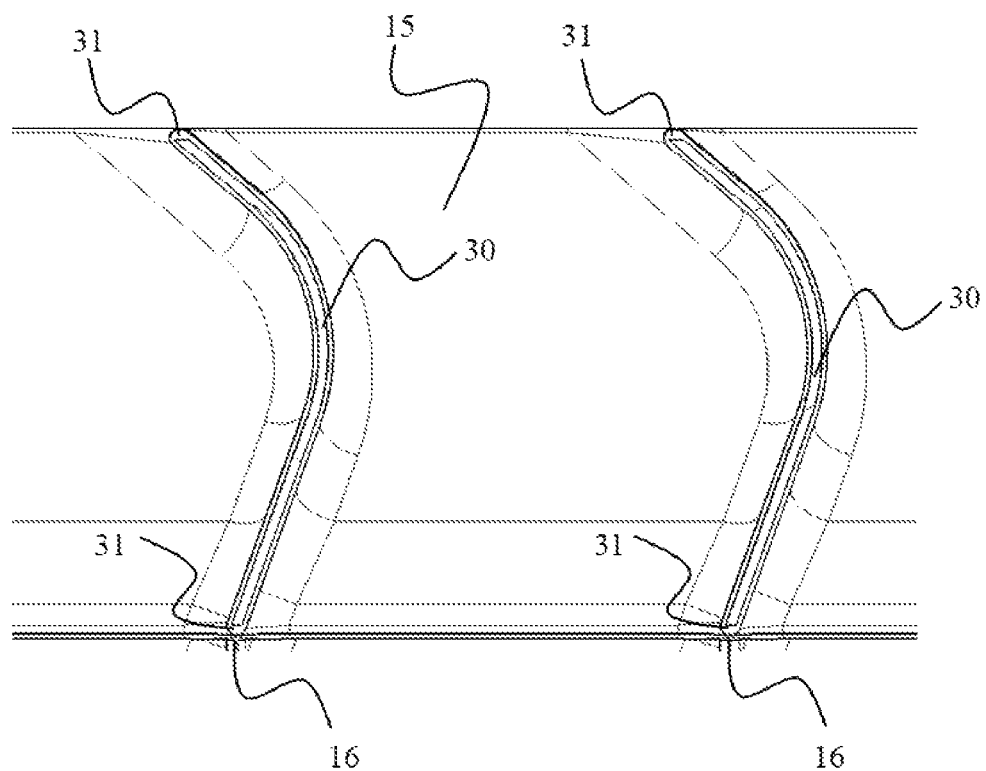

[Fig. 13]
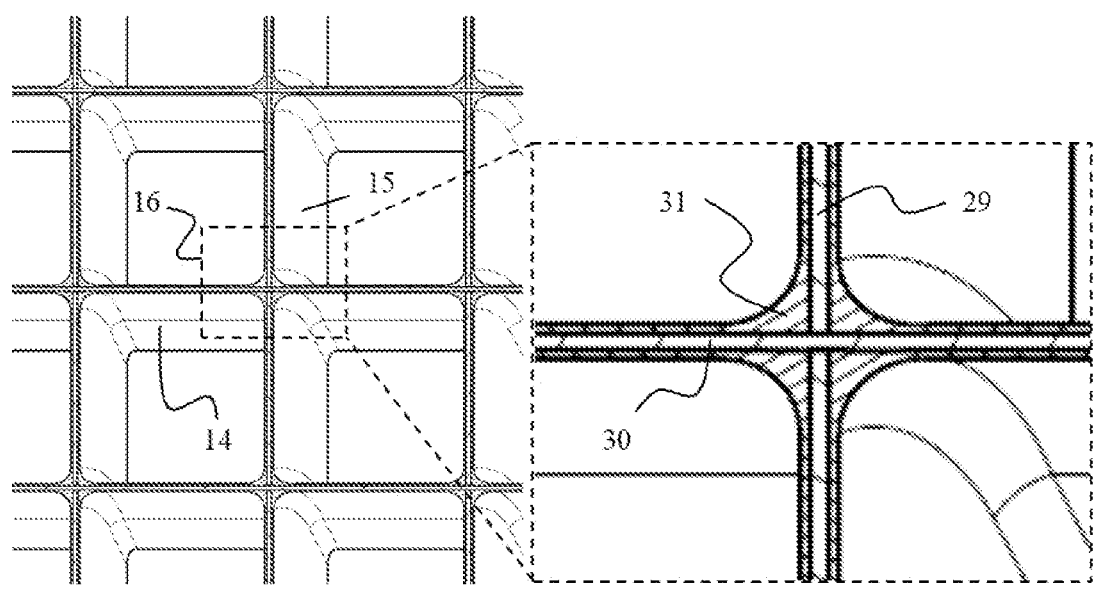

[Fig. 14]
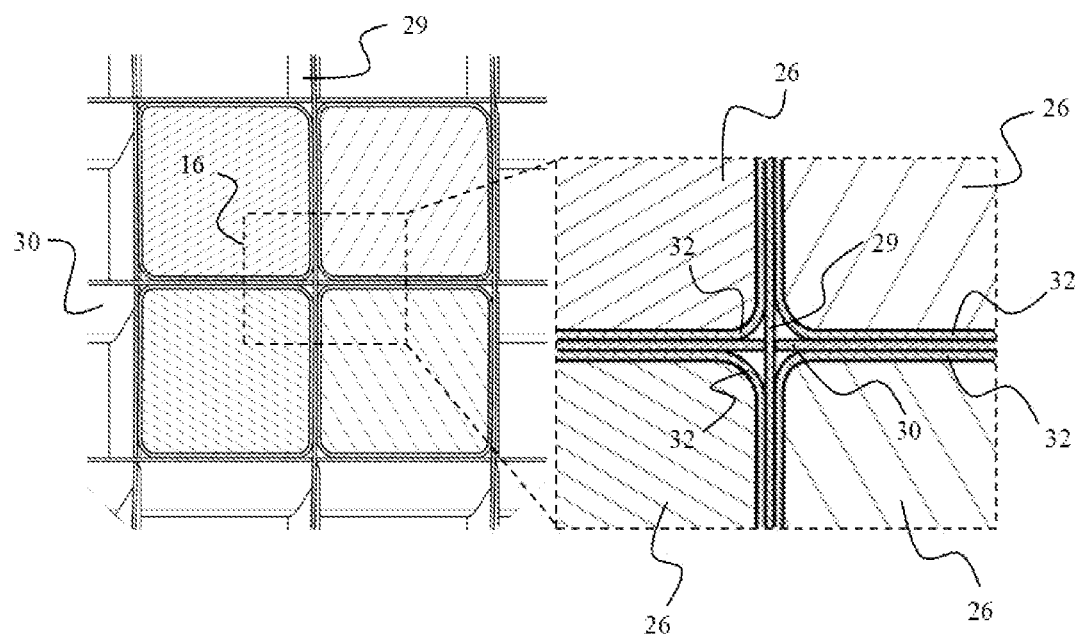
[Fig. 15]
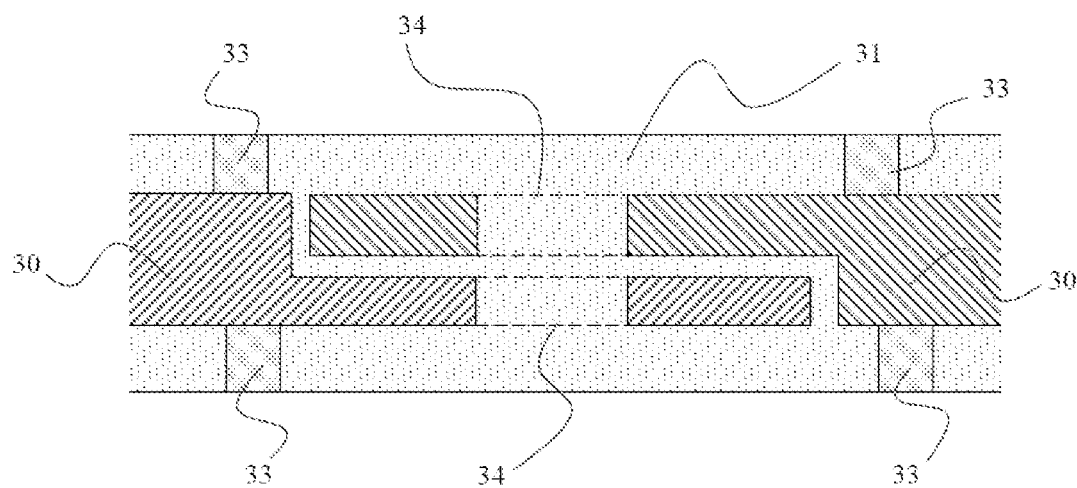

[Fig. 16]
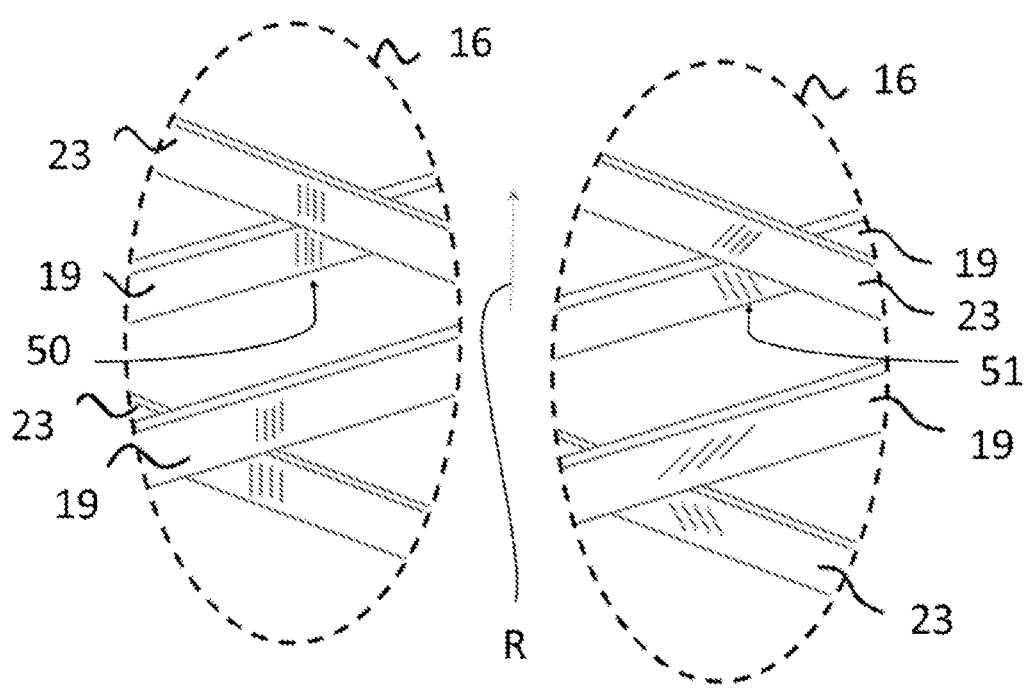
[Fig. 17]
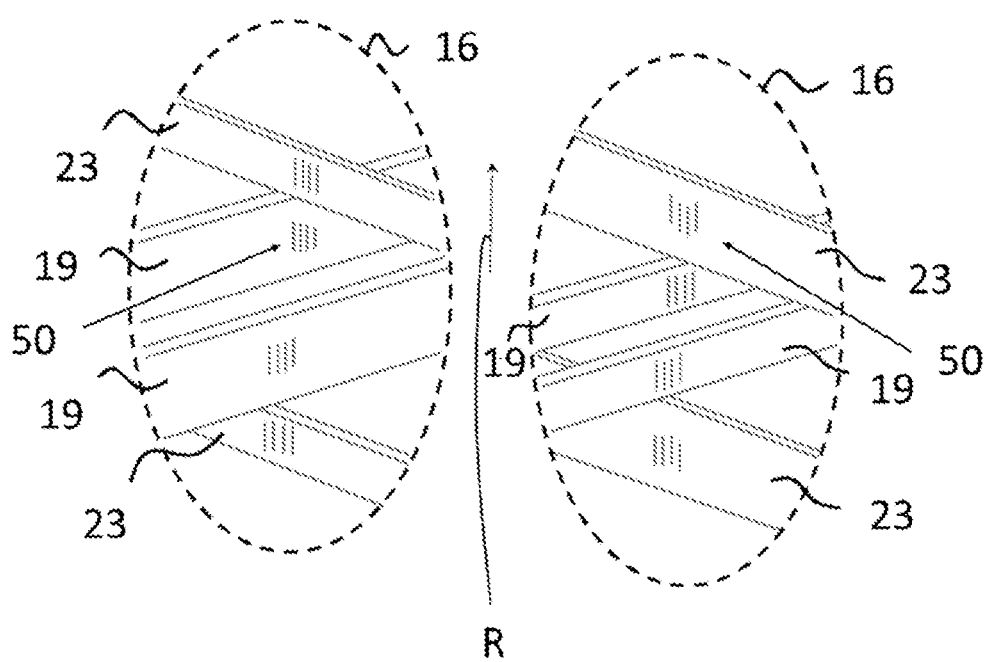

US 11,668,264 B2

LONG-FIBRE-REINFORCED-JOINTS-COMPOSITE THRUST REVERSER CASCADE

TECHNICAL FIELD

The present invention focuses on a thrust reverser composite cascade, and its manufacturing process.

TECHNICAL BACKGROUND

Thrust reversers are used to shorten landing aircrafts' braking range, by generating a counter-thrust, obtained by turning forward a portion of the engine exit air flow.

Cascade thrust reversers comprise cascades for orienting the exit air flow outward the nacelle following accurate flow paths, in order to ensure aerodynamic performance by counter-thrust orientation. Cascade geometry is made of several parallel and equidistant vanes crossing several parallel and equidistant strongbacks and defining cells. Strongbacks are longitudinal structures to which transverse structures of vanes are attached, and routing counter-thrust loads outward the cascades, generally towards nacelle forward frame. These structures are potentially profiled to enable some aerodynamic function. Vanes are transverse structures to strongbacks, generally profiled to ensure forward reorientation of engine air flow, and connected to strongbacks in order to have them routing the so-collected counter-thrust loads.

Cascades are subject to multiple operating constraints.

First of all, they must keep their shape without failure despite nacelle interface loads and aerodynamic thrust. Then, they must be able to withstand, over the long term, despite repeated cycles of use, the effects of heat and cold, the effect of ground and flight vibrations, the effects of moisture and tarmac chemical agents and the probable impact of a random body.

The two main loadings of a thrust reverser cascade are considered to be axial tension of strongbacks, and hoop deflexion of vanes. Axial tension of strongbacks matches the sum of aerodynamic reverse loads collected by each vane and transmitted to strongbacks by vane/strongback joints. Since the loads collected by its strongbacks are essentially applied to the nacelle forward frame by the cascade, strongbacks axial tension magnitude is maximal on its forward flange and minimal on its aft flange.

Vanes hoop deflexion is a more complex phenomenon to understand. It depends, indeed, on several phenomena: overall deformations of the reverser, notably under its own weight, aerodynamic loads reacted by vanes, dynamic phenomena, etc. In particular, the engine exit air flow redirected towards the cascades by the blocker doors undergoes an overall variation of axial, but also radially centrifugal, momentum. Since the vertical direction of air exit is blocked upward and downward by the upper and lower beams which support the nacelle, the resultant of the radially centrifugal momentum variation exhibits a horizontal component that is different from its vertical component. Furthermore, there is no vertical symmetry in the structure of the reverser, because of the pylon which is situated in the upper part. These multiple loads combined with the dissymmetry generate an ovalization of the cascades as a whole, and therefore a hoop deflexion.

Since nacelle forward frame is sized to collect the reverse loads and to support the nacelle, its stiffness is significantly larger than that of aft frame. Subsequently, with imposed lateral crushing load, forward frame ovalization is negligible compared to that of more flexible aft frame. Fastening cascade to these two frames creates inside the cascade a forward-to-aft-increasing hoop deflexion strain gradient. Accordingly, magnitude of vanes hoop deflexion is minimal at forward flange and maximal at aft flange.

Over the last thirty years, industrial growth of materials manufacturing for aeronautics has unceasingly provided increasingly suited candidate materials to this kind of specification.

However, materials industrial processing for specifically forming the mutually overhanging cells geometries (also referred to as undercuts) of a thrust reverser cascade raises significant technical obstacles that have to be overcome, thus justifying the scarcity of hitherto successful applications. One of these applications consists in manually pre-positioning and pre-assembly the three-dimensional shapes of cascades vanes and strongbacks in the form of various pieces of composite materials of aeronautical quality, before consolidating them through pressure and heat. This provides the needed versatility for the creation of multiple vane orientation geometries by means of a single process. Despite its success, this manufacturing process is, on the one hand, costly in terms of qualified workforce, and, on the other hand, because of the relatively low geometrical precision of the repeated manual operations, accompanied with geometrical manufacturing tolerances that are detrimental in terms of productivity and in terms of scrap rates.

To overcome these problems while keeping usage of fibres and dies, other manufacturing techniques were recently proposed.

US 2015/0226157 application describes a process for manufacturing a thrust reverser cascade by an additive process, in which a metal or composite skeleton is covered with a resin giving the cascade its aerodynamic shape. The structure of the skeleton is not described in detail.

US 2016/0186689 application describes a manufacturing process in which strongbacks are manufactured with a continuous fibres reinforced thermoplastic resin and vanes are manufactured separately out of a thermoplastic material filled with randomly oriented short fibres, before being assembled with strongbacks in a mould. Vanes can be inserted individually between strongbacks or form part of modules that have substantially same length as strongbacks and that are inserted in-between them. The mould used for assembling strongbacks and vanes may include water-soluble inserts.

US 2016/0263820 application describes a similar manufacturing process, based on modular construction.

US 2018/0340492 application discloses a manufacturing process based on the prefabrication of modules each comprising a strongback and portions of vanes connected to them, these modules being assembled together within the cascade.

US 2017/0057166 application discloses an additive manufacturing process based on the radial overlaying of layers of thermoplastic material containing bidirectional fibres in the plane of each layer, this process not allowing reinforcement fibres to be positioned across layers, which cancels out reinforcement resistance to radial loads compared to existing cascades obtained by processes incorporating reinforcement fibres in radial direction.

US 4 596/621 application discloses a manufacturing process which is inclusive of a slide-moulding step enabling the removal from mould of solely removable aerodynamic cavities shapes, i.e. excluding overhanging shapes usually associated with the search for aerodynamic performance, and leaving thereon parting lines between the two slides used for each cavity, which further degrades aerodynamic quality compared to a smooth surface.

The common drawback of the processes described in these applications is that there is no demonstration as to how the obtained products will be able to have specific strength characteristics that are at least equivalent to or greater than those of the state of the art. Furthermore, in these applications, as in the state of the art, the structural continuity of the assembled pieces and materials is obtained from the adhesive properties of the matrices, or owing to the specific use of adhesives. The matrix, with or without short fibres, is generally an isotropic component of a composite material, structurally binding the fibres to one another. Within the finished product, there are potentially places and directions of loading in which the structural load is primarily supported by non-reinforced matrix or non-reinforced adhesive. Given the large strength discrepancy between reinforcement and matrix or adhesive, strong singularities of failure mode predominance are thus scattered throughout the structure as a constraining function of the geometrical reinforcement configurations made feasible by each new process.

Vane and strongback joints of a thrust reverser cascade can be partitioned as a field of X-joints surrounded by a peripheral T-jointed frame. X-joints denote any intersection of vanes and strongbacks such that strongback crosses vane and vane crosses strongback. T-joints designate any intersection of vanes and strongbacks such that vane does not cross strongback, and strongback does not cross vane. Producing these joints generally involves using adhesives or adhesive matrix properties to bind pieces of reinforced material to one another. When a tensile load is applied to a T- or X-joint branch, the adhesive interface is as much tensile and shear loaded as the branches of the joint. The most problematic cases of structural weakness are encountered in areas where the relative weakness of the joint compared to its branch becomes critical, notably at locations where the thinness of the intersections does not make it possible to incorporate large adhesive interface areas. Since the thinness of X-joints intersections corresponds to a need for exit air flow section linked to jet engine thermodynamic stability, modifying it cannot be expected because of the prohibitive consequences on the recertification cost of the propulsion unit. On the contrary, T-joints of cascade forward and aft flanges gussets can be freely thickened without modifying the exit air flow section at the centre of the cascade.

DESCRIPTION OF THE INVENTION

There is a need to further improve thrust reverser composite cascades, and the processes for manufacturing such cascades, in order notably to remedy all or some of the drawbacks of known composite cascades, and in particular benefit from a cascade that is strong, lightweight and has low geometrical manufacturing tolerances.

SUMMARY OF THE INVENTION

The invention aims to address this need for improvement and succeeds in this, according to a first of its aspects, owing to a thrust reverser composite cascade, comprising at least one longitudinal wall and transverse walls connecting to this longitudinal wall, characterized in that the longitudinal wall comprises at least one continuous longitudinal fibre bundle and the transverse walls each comprise at least one continuous transverse fibre bundle crossing the longitudinal bundle so that the intersections of the transverse and longitudinal walls can be structurally bridged in both directions by the reinforcing continuous longitudinal and transverse fibre bundles.

The invention makes it possible to obtain relatively large useful fibre sections, with a well-defined surface condition for the body of the cascade. The cascade can gain lightness and/or mechanical strength. The cascade can be produced with shapes that cannot naturally be removed from a mould.

Optimal resistance to hoop deflexion being preferably obtained owing to the use of a continuous transverse reinforcement, while optimal resistance to axial tensile load is preferably obtained owing to the use of a continuous longitudinal reinforcement, the invention allows both reinforcement orientations to cross each other without discontinuity and occupying the internal volume of the cascade in a complementary manner, such that the quantity of continuous reinforcement is everywhere similar but disposed in variable proportions, preferably with more longitudinal continuous reinforcement forward and more transverse continuous reinforcement aft, the stiffest frame however being possibly located forward or aft.

In other words, to achieve the aim of specific strength, the invention reinforces the adhesive interfaces of the X-joints by incorporating in them complementarily crossed continuous reinforcements.

The longitudinal walls are also called strongbacks, and are oriented in the lengthwise direction of the cascade.

The transverse walls are also called vanes, and form, with strongbacks, air-guiding channels.

The connections of the at least one longitudinal wall and the transverse wall define cells, which constitute air guiding channels. Preferably, at least some of the cells are mutually overhanging, and more preferably each cell exhibits an overhanging shape.

"Crossing" should be understood to mean that, when the cascade is observed from above, the continuous bundle of transverse fibres extends continuously from one side to the other of the continuous bundle of longitudinal fibres. The transverse and longitudinal bundles may or may not come into contact where they cross. When the bundles cross without coming into contact, the transverse bundle for example crosses the longitudinal bundle at a different height within the cascade.

"Continuous fibre bundle" should be understood to mean that the fibres are themselves individually continuous over all the length of the bundle, which is preferred, or, as a variant, that they are continuous over only a portion of the length of the bundle but overlap one another sufficiently, over a portion of their length, for the overlapping of the fibres with one another to ensure the transmission of the elongation loads and give the bundle a mechanical behaviour close to that of a bundle composed of fibres that are continuous all over its length.

The crossing of the fibre bundles gives the invention an increased mechanical strength, reducing the risk of delamination at the interface between strongbacks and vanes.

The improvement of the mechanical properties of the cascade makes it possible to lighten it, for a mechanical strength equivalent to that of the known cascades, or, with equal weight, to increase its strength.

Advantageously, the quantity of fibres in the continuous bundles of continuous reinforcement is matched to the intensity of the longitudinal and transverse loads, by placing more continuous longitudinal bundle fibres in an axial load introduction zone, and more continuous transverse bundle fibres in zones subject to greater hoop deformations and ovalization.

Each continuous longitudinal fibre bundle and each continuous transverse fibre bundle each preferably have a thickness, in the radial direction, at the intersections of the transverse and longitudinal walls, strictly less than the thickness of the cascade, in the radial direction, at the intersections of the transverse and longitudinal walls.

"Radial direction" should be understood to mean the direction of the thickness of the cascade.

The longitudinal and transverse walls can be neither rectilinear nor right-angled, but cross each other diagonally or with a variable non-right angle, preferably 45° or 25°, to ensure control of the reverse flow.

Preferably, the longitudinal wall or walls are connected to a peripheral cascade frame, such that it consists of forward and aft flanges and two outmost lateral longitudinal walls of the cascade. The longitudinal walls can thus be connected at their opposite ends to two opposite sides of the peripheral frame. Also preferably, at least a portion of the transverse walls is connected to the peripheral frame and, better, the transverse walls are all connected, at their ends, to the peripheral frame.

It is advantageous for the transverse fibre bundle to extend continuously between the two outmost lateral longitudinal walls. Likewise, it is preferable for the longitudinal bundle to extend continuously from a forward flange to an aft flange.

The body of the cascade can be formed by a plastic material at least partially covering the fibre bundles, notably made out of a thermoplastic or thermosetting material, so as to form aerodynamic surface geometries. The plastic material is advantageously overmoulded or draped on the fibre bundles or the preforms which incorporate them, as detailed later.

As a variant, conversely, the cascade comprises fibre bundles at least partially covering a body made out of a plastic material, so as to form aerodynamic surface geometries.

The continuous transverse bundle can extend across at least two longitudinal walls, and notably extend across all the longitudinal walls, which is the case when it links the outmost lateral longitudinal walls.

The cascade can comprise at least two levels of transverse fibre bundles. For example, the continuous longitudinal bundle extends between the two transverse bundles, which cross it respectively above and below.

The cascade can comprise at least two levels of longitudinal bundles.

The fibre bundles can be formed with any reinforcing fibres that are suited to the application. Preferably, carbon fibres are used, but other materials, such as Kevlar or glass, can be used. The used fibres can be coated with a thermoplastic or thermosetting matrix, for example a polyether-ether-ketone or epoxy matrix.

The fibres for example have a section ranging from 5 µm to 10 µm.

The fibres of the continuous longitudinal or transverse bundles can take the form of braids, fabrics, or unidirectional tapes.

All the reinforcing fibres of a bundle can be covered by a thermoplastic or thermosetting matrix compressed to form a shell. As a variant, all the reinforcing fibres are impregnated with a thermoplastic or a thermoset to form a shell by prepreg processing. As another variant, the reinforcing fibres of each bundle are mixed with thermoplastic fibres before they are processed by weaving, braiding or other processes to form a commingled thermoplastic fabric.

The long fibre reinforcements can comprise, and preferably comprise, connecting geometries in order to be tightly fitted together, for example dovetailed outlines allowing them to be fitted to each other.

Another subject of the invention is a nacelle of a jet engine comprising at least one thrust reverser cascade according to the invention, as defined above.

Another subject of the invention, according to another of its aspects, is a process for manufacturing a composite cascade, notably a thrust reverser cascade as defined above, comprising the steps consisting in:

arranging at least one continuous longitudinal fibre bundle and at least one continuous transverse fibre bundle such that the transverse bundle crosses the longitudinal bundle, at least partially covering said bundles with a plastic material to form the body of the cascade.

Preferably, said material is a thermoplastic material. As a variant, it is a thermosetting material.

Said material is preferably injected, into a mould in which said bundles were previously arranged so as to cross. In an advantageous variant, said material is draped around inserts, also in a mould, in which said bundles were previously arranged so as to cross.

According to another embodiment, the process for manufacturing a composite cascade, notably for a thrust reverser and in particular as defined above, comprises the steps consisting in:

forming the body of the cascade by means of a mould, then arranging, by bonding, welding or any other process of external addition of structural material, preferably by additive manufacturing or by wire deposition or even by selective laser sintering, at least one continuous longitudinal fibre bundle and at least one continuous transverse fibre bundle such that the transverse bundle crosses the longitudinal bundle, this step being followed if necessary by an overmoulding step.

The mould according to the present invention can comprise at least one captive insert that cannot be removed from the mould because of its shape. In this case, the captive insert can be removed from the cascade by any means, notably chemical attack, mechanical fragmentation, deformation, melting and/or dissolution.

The fibres can be pre-coated with a plastic material within the bundles when they are put in place, as mentioned above.

The bundles can be part of preforms when they are introduced into the mould.

The positioning of the bundles or preforms can be performed robotically.

The inserts can have a shape that allows them to be positioned in a predefined manner in the mould; for example, the inserts comprise first fitting edges cooperating with second fitting edges of the mould to ensure their positioning. When the inserts comprise a re-usable core and a jacket which is eliminated after each moulding operation, the first fitting edges can be produced on the core.

When the elimination is done by chemical attack, for example by a base, an acid or water, the inserts are for example made out at least partially of aluminium or of a material of ceramic type.

In case of elimination by mechanical fragmentation, the inserts are for example at least partially made out of a material of ceramic type, glass or porcelain for example.

In case of elimination by deformation, the inserts are for example at least partially made out of a flexible material of silicone elastomer or fluoroelastomer type for example.

In case of thermal elimination by melting of the inserts, the latter are for example made out of a material whose melting point is higher than the processing temperature of the plastic material in the mould but lower than the temperature of degradation thereof; the inserts are for example at least partially made out of an alloy of tin, lead or aluminium.

In case of elimination by dissolution in water or an aqueous solution, with effervescence if necessary, the inserts can be at least partially made out of a material of ceramic type.

The first fitting edges can comprise centring pins, protuberances, notably of oblong or diamond shape, in the form of open cavities, or any combination of these shapes.

In a variant processing, the reinforcements of the cascade are composed of reinforcing fibres coated with a plastic material, preferably thermoplastic, deposited by additive manufacturing.

The fibre bundles can be manufactured separately from textile fibre reinforcement architectures, for example fabrics or unidirectional tapes, and incorporating connection geometries in order to be tightly fitted together, before being overmoulded or draped, or added externally to a cascade body. The fabric fibre architectures of the bundles may be produced in different ways, such as weaving, braiding or knitting, uniform or staged in thicknesses, with or without orifices for the provision of fastening systems. The use of fabric makes it possible to obtain a reinforcement by long fibres that is bidirectional in the at least one longitudinal wall and in the transverse walls, and tri-directional at the intersections of the transverse and longitudinal walls by the crossing of the bundles.

Preferably, the bundles incorporate long reinforcing fibres extending in the radial direction.

In this case, the long reinforcing fibres are preferably oriented at an angle of about 0° or about 45° with respect to the radial direction.

The long reinforcing fibres preferably extend, in the radial direction, from a lower edge to an upper edge of each transverse wall and each longitudinal wall and between each intersection of the transverse and longitudinal walls.

The result of the injection of thermoplastic material by overmoulding in an orifice emerging through the overlap of two superposed bundles of variable thicknesses is an example of thermoplastic fastening system. The solidity of the assembly of the crossed bundles can be ensured before injection by the tightening of the fittings, and after injection by the use of fastening systems.

To achieve the objective of reducing the geometrical manufacturing tolerances of the manual construction process, the manufacturing can proceed by sequences of at least two operations. The first operation of a sequence consists in positioning pre-prepared long fibre vane and strongback reinforcements in a mould. The second operation of the sequence consists in adding the material necessary for the completion of the outer contours of the cascade. The long fibre reinforcements are composite structures composed of a matrix reinforced by long fibres. A long fibre reinforcement is characterized by a tensile failure mode necessitating the failure of the long fibres, unlike a short fibre structure in which the tensile failure is primarily triggered by the weakness of the matrix. In the first operation of a sequence, the X-joints are identified spatially by the physical crossing of the fibre bundles. A fibre bundle is a set of long fibres constituting a sub-part of a long fibre reinforcement. The crossing of the fibre bundles notably allows for the structural bridging of the X-joint, such that the total failure of a joint necessarily involves the failure of long fibres. The rigidity of the long fibre reinforcements makes it possible to assemble them mechanically without fastenings by virtue of connection geometries, such that their relative movements are limited once they are assembled. In the case of insert draping, this limitation of the relative movements allows the manual operator involved in the second operation of the sequence to more accurately position the missing material, his or her hand being guided by the rigidity of the duly performed pre-positioning of the X-joints. In the case where the second operation of the manufacturing sequence is performed by injection of thermoplastic or thermosetting material, this limitation of the relative movements makes it possible to preserve the volume of the cavities to be filled between the reinforcement and the mould or its inserts. An insert is a mould part in which the geometry of the outer enclosure coincides with that of the internal walls of a cascade cell. Because of the differences in angle of direction of the air flow between the inlet and the outlet of each cell, the overhanging shapes of the cascade generally make it unable to be taken from the mould without deformation or destruction of the inserts of the mould. The invention also allows for the use of a mould with embedded inserts such that the geometries of the outer contours of the body of the cascade are no longer influenced by the gestures of the manual operators. In the case of use of a mould with eliminable embedded inserts, the invention makes it possible to reduce the geometrical manufacturing tolerances to the point of being able to mould leading and trailing edges of rounded shapes on each vane and each strongback. In the case of use of a mould with embedded inserts, for certain cell geometries, the invention makes it possible to use a two-part punch and die mould with a joint plane shrewdly positioned to allow removal from the mould without destruction or deformation of the inserts. In the case of the presence of a joint plane on an aerodynamic surface area, the invention makes it possible to access aerodynamic surface finishing by tribofinishing, polishing, etc., designed to render the finished product free of any anfractuosity or unevenness that is prejudicial to the flow of the air flow.

Another subject of the invention, independent of or in combination with the above, is a long-fibre-reinforced-joints-composite thrust reverser cascade, comprising at least one longitudinal wall and transverse walls connecting to this longitudinal wall, characterized in that the longitudinal wall comprises at least one continuous longitudinal fibre bundle and the transverse walls each comprise at least one continuous transverse fibre bundle crossing the longitudinal bundle, such that the intersections of the crossed walls are structurally bridged in both directions by a non-zero quantity of continuous long-fibre reinforcement.

BRIEF DESCRIPTION OF THE DRAWINGS

FIG. 1 schematically represents a substructure of a jet engine nacelle equipped with thrust reverser cascades according to the invention.

FIG. 2 illustrates, in the finished elements, the deformations of the forward and aft frames leading to the deformations of the forward and aft flanges of a cascade during a reverse thrust action.

FIG. 3 illustrates on its own a long-fibre-reinforced-joints-composite thrust reverser cascade.

FIG. 4 schematically represents examples of crossing of bundles in a cascade.

FIG. 5 is a schematic view illustrating the crossings of reinforcements of a set of cascade reinforcements.

FIG. 6 illustrates a step of the manufacturing process.

FIG. 7 illustrates another step of the manufacturing process.

FIG. 8 illustrates another step of the manufacturing process.

FIG. 9 illustrates another step of the manufacturing process.

FIG. 10 illustrates another step of the manufacturing process.

FIG. 11 illustrates another step of the manufacturing process.

FIG. 12 is a partial longitudinal cross section of the overmoulded cascade.

FIG. 13 is a partial radial cross section of the cascade with reinforced joints, at a joint obtained by reinforcement overmoulding.

FIG. 14 is a partial radial cross section during the step illustrated by FIG. 6 of the process for manufacturing a variant of the cascade with reinforced joints, at a joint obtained by reinforcement draping.

FIG. 15 is a partial radial cross section view of overmoulded reinforcements,

FIG. 16 schematically shows examples of long reinforcing fibres extending in the radial direction in bundles in a cascade, and FIG. 17 illustrates bundles of various thicknesses (radial dimensions) extending in the radial direction at crossing of bundles in a cascade.

DETAILED DESCRIPTION

FIG. 1 shows a simplified representation of a substructure of the nacelle of a jet engine equipped with a cascade thrust reverser 1. The nacelle substructure contains a forward frame 4, an aft frame 5, an upper beam zone 6, called 12 o'clock beam, a lower beam zone 7, called 6 o'clock beam, a central location 8 for installation of the parts of the jet engine. The nacelle supports a mechanism 9 that is known in itself that makes it possible to block a part of the air flow entering into the jet engine to return it through the cascades 1 and forward in order to generate a counter-thrust.

The cascades 1 are disposed around the longitudinal axis 10 of the jet engine and held fastened to the forward 4 and aft 5 frames by forward 2 and aft 3 cascade flange fasteners, and have aerodynamic shapes chosen so as to return the air flow on accurate paths. In FIG. 2, superposed individually are the partial views modelled on the finished elements of a cascade 1 fastened to the front 4 and aft 5 frames not subject to any strain, and the same nacelle parts undergoing deformations due to the mechanical work of a reverse thrust. The bending and unbending deformation 11 of the forward frame is relatively small compared to the bending and unbending deformation 12 of the aft frame, leading to the creation of a forward-to-aft increasing gradient of bending or unbending deformation 13 of the attached cascades.

FIG. 3 shows an example of cascade 1 on its own.

The latter has a shape that is generally elongate along a longitudinal axis 10, parallel to the axis of propulsion of the propulsive unit formed by the jet engine and its nacelle.

The cascade 1 comprises, at its periphery, two forward 2 and aft 3 flanges, intended for the fastening of the cascade 1 in the nacelle substructure of FIG. 1, and has, for example, a generally rectangular form as illustrated.

The cells 60 of the cascade 1, which define the air guiding channels, are formed by longitudinal walls 15, hereinafter called strongbacks, which extend in the longitudinal direction, and transverse walls 14 which extend transversely to strongbacks 15. The channel of each cell can thus have a section, generally of polygonal shape, notably square or rectangular, that is offered to the exit air flow.

The intersections of the longitudinal 15 and transverse 14 walls constitute the joints which can be divided into two categories: on the periphery of the cascade, the T-joints, 17, such that one of the intersecting walls does not cross the other, and, at the centre of the cascade, the X-joints, 16, such that the intersecting walls mutually cross. According to the invention, these X-joints, 16, are bridged structurally in both directions by long-fibre reinforcements.

FIG. 4 shows several examples of crossings of longitudinal bundles 19 and of transverse bundles 23 that make it possible to reinforce an X-joint 16 zone. For example, two continuous longitudinal bundles 19 extend between two transverse bundles 23, which cross them respectively above and below the level of the zone of the X-joint 16. For example, a single continuous longitudinal bundle 19 extends above a single transverse bundle 23 which crosses it below at an X-joint zone, 16. For example, these last two bundles, longitudinal 19 and transverse 23, are subparts of two continuous, longitudinal 18 and transverse 21, long-fibre reinforcements, machined to be tightly fitted at an X-joint zone, 16.

According to one aspect of the invention, the cascade 1 comprises a set of reinforcing fibres, represented individually and partially in FIG. 5, comprising longitudinal fibre bundles 19 which cross with transverse fibre bundles 23. This set of FIG. 5 is covered within the cascade at least partially by a skin of plastic material which constitutes the body of the cascade. The body of the cascade has aerodynamic profiles at the cell level.

The continuous longitudinal bundles 19 are formed by long fibres and extend over all the length of strongbacks 15 from the forward flange 2 to the aft flange 3. Likewise, the continuous transverse bundles 23 are formed by long fibres and extend over all the length of the transverse walls 14, joining the lateral outer contours of the cascade 1.

As visible on FIG. 16, the longitudinal bundles 19 and the transverse bundles 23 may incorporate long reinforcing fibres 50 arranged in order to form an angle of about 0° with the radial direction R.

The longitudinal bundles 19 and the transverse bundles 23 can also incorporate long reinforcing fibres 51 arranged in order to form an angle of about 45° with the radial direction R.

The fibre bundles 19 and 23 are preferably formed with carbon fibres, but other reinforcing materials can be used in place of carbon and/or mixed therewith, such as Kevlar, glass, linen, etc.

As can be seen in FIG. 5, the bundles 19 and 23 cross at the intersection of strongbacks 15 with the transverse walls 14 of FIG. 3.

The crossing of the bundles 18 and 21 is performed for example by arranging these bundles at different heights within the cascade 1, as illustrated by the exploded view of FIG. 5. For example, FIG. 5, the exploded view of the reinforcements of the cascade 1, contains a level of strongback reinforcements 18 with discontinuous leading edges 20 and continuous trailing edges 19, crossed with a level of vane reinforcements 21 with continuous leading edges 23 and discontinuous trailing edges 22. In this example, the partial discontinuities of the reinforcements 18 and 21 are useful to the crossing of their longitudinal and transverse bundles by fitting them together. The height of the continuous part of the strongback reinforcement 18 at all points complements the height of the continuous part of the vane reinforcement 21. The aft-to-forward collection of the counter-thrust loads justifies the increasingly small forward-to-aft proportion of the height of passage reserved for the strongback bundles. The increasingly great forward-to-aft height of the continuous vane reinforcements indicates an increasing resistance to the deflexion of the aft frame. The choice of keeping the continuity of the concave leading edge of the reinforcement 21 indicates that it is the resistance to unbending which is helped. In fact, upon a spreading of the frame 5, the concave edge of the reinforcement 21 is subject to tensile and shear stresses that are detrimental to the adhesive interfaces, while the convex edge of the reinforcement 21 is subject to compression and shear stresses that are less detrimental to the adhesive interfaces. A second example of set of reinforcements is obtained by simply exchanging, for each reinforcement, the positions of the continuous and discontinuous edges of FIG. 4. In the case where the cascade 1 is positioned at a point of the frame 5 where the resistance to bending is more necessary, the discontinuities of the reinforcements 18 are inversely positioned on the trailing edge side, and the discontinuities of the reinforcements 21 are inversely positioned on the leading edge side. In fact, the bending consists in bending the frame 5, which is equivalent to reversing the positions of the tensile and compression stresses by comparison to unbending case. Contrary to the first example of arrangement of reinforcements of FIG. 5 in which the vane reinforcements 21 are fitted into the strongback reinforcements 18 from bottom, in the case of this second example of arrangement of reinforcements which will be used in FIGS. 6 to 11 to illustrate an example of manufacturing process, the vane reinforcements 30 are fitted into the strongback reinforcements 29 from top.

Each longitudinal bundle 19 and each transverse bundle 23 may each have a thickness, in the radial direction R, at the intersections 16 that is strictly less than the thickness of the cascade 1, in the radial direction R, at the intersections 16.

As visible on FIG. 17, the thicknesses in the radial direction R of the longitudinal bundles 19 and of the transverse bundles 23 may be different while keeping the same thickness of the cascade 1 in the radial direction R at the intersections 16.

The bundles or long-fibre reinforcements which incorporate them can be given various shapes and/or orientations drawn from these two examples.

The fibres of the bundles can be bonded by or coated with a plastic material, notably thermoplastic, and each bundle is for example present within a preform. The cohesion of the different fibres of the bundle within the preform is for example obtained by the local melting of a matrix of thermoplastic material coating the fibres.

An example of process for manufacturing a cascade 1 will now be described with reference to FIGS. 6 to 14.

For simplification, the manufacture of certain reinforced cascade joints, i.e. the X-joints, will be described, it being understood that the T-joints are not reinforced by fibres but sized by the necessary adhesive interface surfaces.

The cascade 1 in this example comprises nine strongbacks 15 and twelve transverse vanes 14, among which the ten transverse vanes 14 at the centre form X-joints 16 with strongbacks 15.

To produce the cascade 1, a mould 25 such as that illustrated in FIGS. 6 to 11 can be used, comprising a mould cavity 27 in which inserts are arranged, including at least one first row of inserts 26 and one second row of inserts 26, visible notably in FIG. 9.

The inserts 26 define between them, within the cavity 27, spaces for receiving the first level of longitudinal bundles 29, as can be seen in FIG. 6.

The inserts 26 are progressively put in place, row by row, after the insertion of the bundles 29 or 30. Each bundle 29 or 30 can be put in place by robotized means, as can the inserts 26. The latter can comprise fittings which ensure a predefined positioning within the mould by means of a mechanical fitting, such as, for example, by using retractable guiding and locking fingers 28 at the bottom of the mould cavity 27. In a variant in FIG. 14, the inserts 26 are draped with thermoplastic or thermosetting material 32, such that the body of the cascade is completed upon the installation of the inserts 26 in the mould 25.

In FIG. 6, a first row of inserts 26 can be seen, in which there is placed a transverse bundle 30, as illustrated in FIG. 7. Then, a new row of inserts 26 is put in place so as to cover the transverse bundle 30, as illustrated in FIG. 8. A new transverse bundle 30 can be installed, as illustrated in FIG. 9, before being covered by a new row of inserts 26, to culminate in the configuration represented in FIG. 10.

Once all the bundles 29 and 30 have been put in place, the thermoplastic material constituting the body 31 of the cascade 1 is injected into the cavity 27 of the mould 25 modified by the presence of the inserts 26 of FIG. 11, and partially occupied by the reinforcements 29 and 30, to culminate in the mould filled with material 31 as illustrated in the enlargements of sections of FIGS. 12 and 13. The injection of the plastic material can be performed through several channels. As illustrated by the cross-sectional view of overmoulded reinforcements in FIG. 15, if necessary, positioning shims 33 are used to hold the bundles at a certain distance from the walls of the inserts 26 and of the mould 25, for example 1 mm. These shims 33 are for example elements in ball, cylinder or cube form, and can be incorporated in the preform 30 during the manufacture thereof. The preforms 30 can also be of variable thickness and contain provisions for fastening systems such as holes 34 allowing the material 31 to form a fastener.

The plastic material injected into the mould is for example chosen from among the families of thermoplastics such as polyaryletherketones, polyetherimides, or from among the thermosets, possibly reinforced by carbon, glass, linen or other fibres.

Prior to the injection of the plastic material into the mould, it is possible, if necessary, to initially heat the mould so as to allow the material forming the matrix of the preforms to melt, in order to obtain a better cohesion of the preforms with one another, at their crossings in particular.

After the injection, the mould can undergo a slow post-curing in order to fuse the matrix of the preforms with the material forming the body of the cascade.

The form of the cavity 27 can be such that the cascade 1 can be removed easily from the mould 25. If necessary, the latter is produced in several parts to facilitate this removal from the mould.

At least a part of the inserts 26 can remain captive in the cascade 1 after the extraction thereof from the mould 25, because of the presence of overhanging shapes at the cells 60 of the cascade.

The removal of the inserts 26 from the mould can be performed in various ways, depending on the technology retained to allow the removal of the insert.

For example, inserts are used that have at least a part which is soluble in a solvent, for example water. In this case, the cascade with the captive inserts is exposed to water, for example by being immersed in a hot bath. The dissolution of the insert reduces its section and allows it to be separated from the walls of the cascade which were opposed to its removal.

The surface condition of the mould and of the inserts can make it possible to avoid a step of grinding of the contours of the cascade by numerically-controlled milling.

Obviously, the invention is not limited to the examples which have just been described.

In particular, the inserts of the mould can be produced in such a way that the removal from the mould is performed other than by the partial or total solubilization of the insert, for example by using fusible, brittle or flexible inserts, that can be removed by subjecting the cascade and the captive inserts to heating, impacts, vibrations, deformations.

The inserts can be entirely soluble, fusible, brittle or flexible, or, as a variant, comprise a core or other reusable part and an enclosure which is destroyed on each production cycle.

The invention claimed is:

1. A thrust reverser composite cascade comprising cells, at least some of the cells having overhanging shapes, the cascade comprising:
    at least one longitudinal wall comprising at least one continuous longitudinal fibre bundle with a textile fibre reinforcement architecture; and
    transverse walls connecting to the at least one longitudinal wall, the transverse walls each comprising at least one continuous transverse fibre bundle with a textile fibre reinforcement architecture crossing the at least one continuous longitudinal fibre bundle at intersections of the transverse and longitudinal walls, so that the intersections of the transverse and longitudinal walls are structurally bridged in both directions by the continuous longitudinal and transverse fibre bundles,
    wherein the at least one continuous longitudinal fibre bundle and the at least one continuous transverse fibre bundle comprise long reinforcing fibres that extend in a radial direction.

2. The cascade according to claim 1, wherein at least one of the long reinforcing fibres extends in the radial direction and is oriented at an angle of about 0° or about 45° with respect to the radial direction.

3. The cascade according to claim 1, wherein the at least one continuous longitudinal fibre bundle comprises the long reinforcing fibres extending from a lower edge to an upper edge of each transverse wall and from each longitudinal wall and between each intersection of the transverse and longitudinal walls.

4. The cascade according to claim 1, wherein each of the at least one continuous longitudinal fibre bundle and each continuous transverse fibre bundle have a thickness, in the radial direction, at the intersections of the transverse and longitudinal walls, strictly less than the thickness of the cascade, in the radial direction, at the intersections of the transverse and longitudinal walls.

5. The cascade according to claim 1, wherein the longitudinal and transverse walls cross each other diagonally or with a variable non-right angle.

6. The cascade according to claim 1, wherein the at least one longitudinal wall comprises at least two longitudinal walls, wherein the at least one continuous transverse fibre bundle extends continuously between two outermost lateral longitudinal walls of the at least two longitudinal walls.

7. The cascade according to claim 6, wherein the at least one continuous longitudinal fibre bundle extends continuously from a forward flange to an aft flange.

8. The cascade according to claim 1, further comprising a body made of a plastic material and at least partially covering the at least one continuous fibre bundle so as to form aerodynamic surface geometries.

9. The cascade according to claim 1, wherein the at least one continuous longitudinal fibre bundle and/or the at least one continuous transverse fibre bundle at least partially covers a body made of plastic material so as to form aerodynamic surface geometries.

10. A process for manufacturing a composite cascade as defined in claim 1, comprising:
    positioning the at least one continuous longitudinal fibre bundle and the at least one continuous transverse fibre bundle so that the at least one continuous transverse fibre bundle crosses the at least one continuous longitudinal fibre bundle,
    at least partially covering the at least one continuous longitudinal fibre bundle and the at least one continuous transverse fibre bundle with a material to form a body of the cascade.

11. The process according to claim 10, wherein the at least partially covering comprises injecting the material into a mould in which the at least one continuous longitudinal fibre bundle and the at least one continuous transverse fibre bundle are arranged so as to cross.

12. The process according to claim 11, wherein the mould comprises at least one captive insert that cannot be removed from the mould of the cascade because of its shape.

13. The process according to claim 12, wherein the at least one captive insert is removed from the cascade by chemical attack, mechanical fragmentation, deformation, melting and/or dissolution.

14. The process according to claim 10, said material being draped around inserts in a mould in which said the at least one continuous longitudinal fibre and the at least one continuous transverse fibre bundle were previously arranged so as to cross.

15. The process according to claim 10, wherein the at least one continuous longitudinal fibre bundle and the at least one continuous transverse fibre bundle are manufactured separately with the textile fibre reinforcement architectures, and include connecting geometries in order to be tightly fitted together, before being overmoulded or draped, or added externally to the cascade body.

16. A process for manufacturing a composite cascade, as defined in claim 1, comprising:
    forming a body of the cascade by means of a mould;
    arranging, by bonding, welding, or any other external process of addition of structural material, the at least one continuous longitudinal fibre bundle and the at least one continuous transverse fibre bundle so that the at least one continuous transverse fibre bundle crosses the at least one continuous longitudinal fibre bundle.

17. The process according to claim 16, the step of arranging the at least one continuous longitudinal fibre bundle and the at least one continuous transverse fibre bundle being followed by an overmoulding step.

18. The process according to claim 16, wherein the arranging comprises additive manufacturing, wire deposition, or selective laser sintering.

* * * * *